June 5, 1951 T. W. CHRISTIE 2,555,572

PHONOGRAPH RECORD CONTAINER AND DISPENSER

Filed Sept. 26, 1947 2 Sheets-Sheet 1

INVENTOR.
THOMAS W. CHRISTIE
BY Edward C. Healy
ATTORNEY

June 5, 1951 T. W. CHRISTIE 2,555,572

PHONOGRAPH RECORD CONTAINER AND DISPENSER

Filed Sept. 26, 1947 2 Sheets-Sheet 2

INVENTOR.
THOMAS W. CHRISTIE
BY Edward C. Healy
ATTORNEY

Patented June 5, 1951

2,555,572

UNITED STATES PATENT OFFICE 2,555,572

PHONOGRAPH RECORD CONTAINER AND DISPENSER

Thomas W. Christie, Vallejo, Calif.

Application September 26, 1947, Serial No. 776,223

1 Claim. (Cl. 312—17)

This invention relates to an improved phonograph record container and dispenser and has particular reference to a device adapted to be mounted in a phonograph cabinet for retaining disc type records therein, in a manner enabling the records to be easily identified when the cabinet door is opened; the invention further relating to a means for individually dispensing the records, whereby the desired record is readily obtained.

In conventional phonograph cabinets of the home type, the records are usually kept in a book or in a spaced compartment within the cabinet and must be removed manually by the user, making it exceedingly slow and difficult to obtain the desired record.

An object of the present invention is the provision of an especially constructed container for holding the phonograph disc records and to provide means for individually dispensing the records by merely pressing a button or the like to obtain the desired record.

Another object of the present invention is to provide a plurality of especially constructed inverted channel-shaped holders capable of vertically carrying and supporting the disc records within the container, and to further provide means for pivotally securing each holder to the container separately and in a see-saw manner, whereby when a record is placed in its holder and the outer end portion of the holder is lifted upwardly, the said record will automatically roll in the container and when the said outer end portion of the holder is pressed downwardly the record will be automatically dispensed from the container.

A still further object of the present invention is to provide a suitable handle or push button member on the outer end portion of each record holder and to extend the said handle or button members through vertical slots provided in the front wall of the container and through which the records are inserted and dispensed.

A still further object of the present invention is to provide numbers or other suitable indicia on the push buttons for separately identifying the records in the different holders.

A still further object of the present invention is the provision of a plurality of vertical partition spaces in the container for keeping the records vertically separated and in their respective holders and for guiding the records through the vertical slots provided in the front wall of the container.

A still further object of the present invention is to provide a phonograph record container and dispenser of the character described that is durable, simple in construction, economical to manufacture, positive in operation and highly efficient and serviceable in use.

Figure 1:
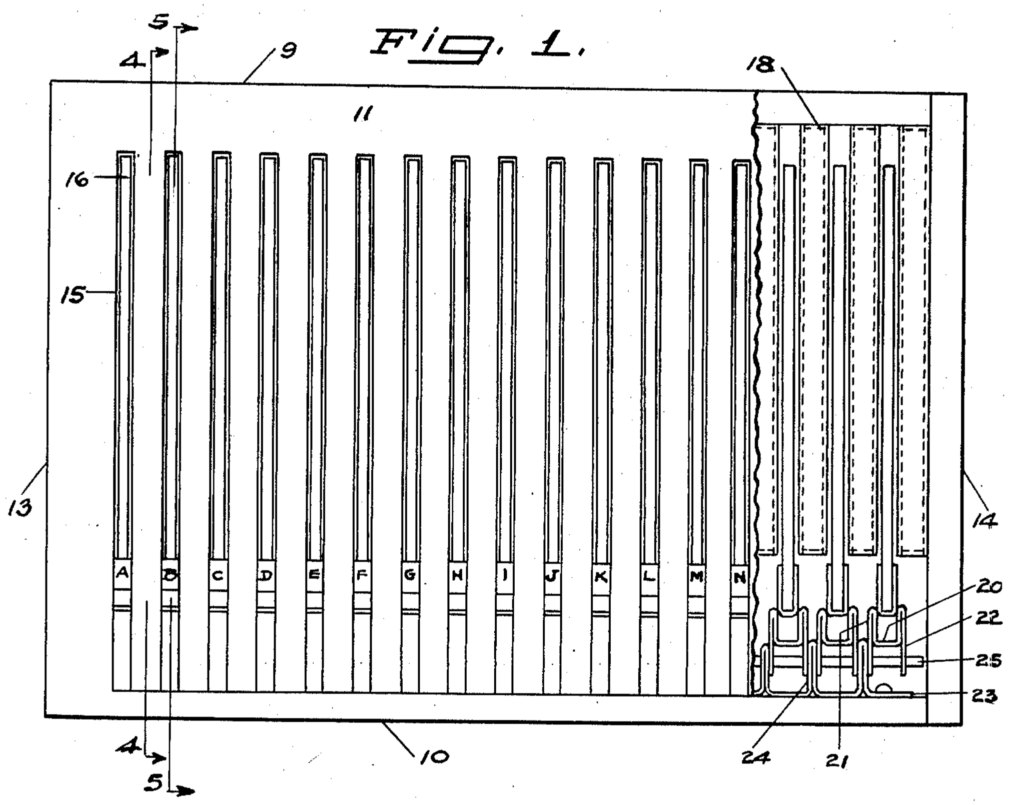
Figure 2:
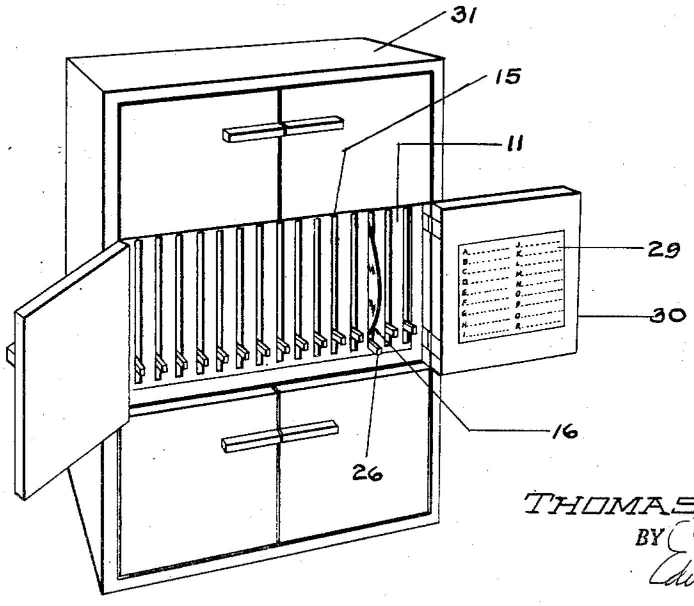
Figure 3:
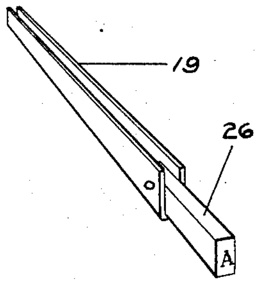
Figure 4:
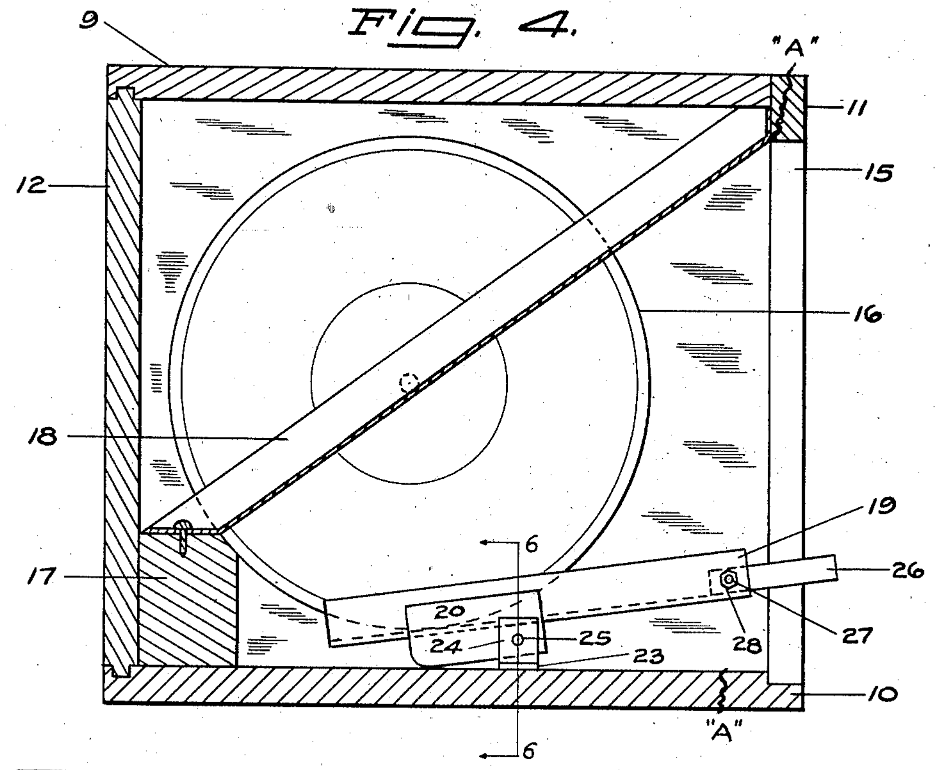
Figures 5, 6:
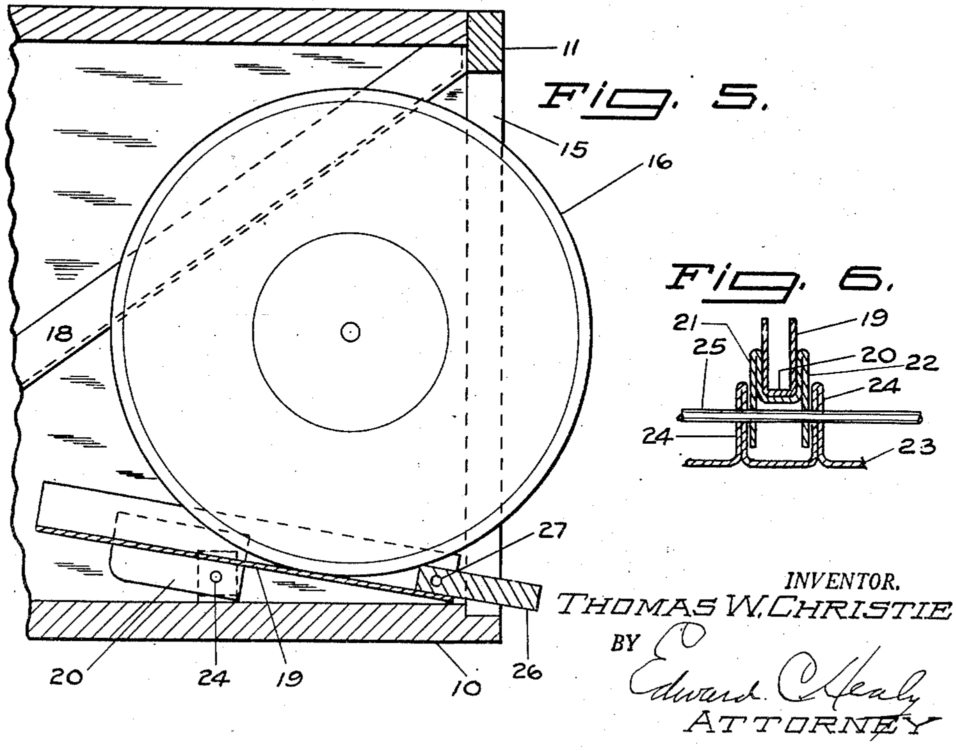

In the accompanying drawings forming a part of this specification, wherein for the purpose of illustration like numerals designate like parts throughout the same, Fig. 1 is a front elevational view of the container, a portion of the front wall being broken away to illustrate the pivoted record holders and vertical partitions within the container, for the purpose of clarity the push buttons being removed from the record holders that show within the container, Fig. 2 is a perspective view of one type of phonograph cabinet and illustrates the improved record container and dispenser therein, Fig. 3 is a perspective view of a preferred type of record holder employed in the invention, Fig. 4 is a vertical sectional view taken on line 4—4 of Fig. 1, looking in the direction of the arrows, showing the push button on the record holder in its upper position and the record in its normal position within the container, for the purpose of clarity, the section through the container being broken as at "A"—"A," to better illustrate the holder extending through its respective vertical slot provided in the front wall of the container, Fig. 5 is a vertical sectional view taken on line 5—5 of Fig. 1, looking in the direction of the arrows, showing the push button moved to its lower position and the phonograph record dispensed to its receiving position, and, Fig. 6 is an enlarged fragmentary sectional view taken on line 6—6 of Fig. 5, illustrating how each holder is pivotally retained to the bottom wall of the container.

Referring in detail to the drawings and to the numerals designating the different parts thereof, the container is of substantially rectangular configuration and embodies in its construction a top 9, bottom 10, front and rear walls, 11 and 12 respectively, and opposite side walls 13 and 14 respectively. The said container is made of any suitable material and the walls thereof secured together in any suitable manner. The rear wall 12 is preferably slidable, providing a door for opening the container. The front wall 11 is formed with a series of vertical slots 15, as shown to advantage in Figs. 1, 4 and 5, which slots are of any suitable size necessary for receiving the phonograph disc type records 16. As the records are made in various sizes, the slots are preferably of a size large enough to accommodate the largest records. A stop member 17 is positioned at the rear portion of the container and longitudinally extends from the side wall 13 to the side wall 14 and in parallelism with the front wall 11, and is secured to the container in any suitable manner. A series of partitions or spacers 18, preferably in the form of inverted channel members, extend from the top face of the said stop member 17 to and against the upper portion of front wall 11 and are arranged between the vertical slots 15 in the said front wall, whereby the phonograph records 16 are retained in a vertical position within the containers and are guided through the slots 15 in the said front wall.

The means provided for dispensing the records from the container through the said slots preferably consist in providing a plurality of inverted channel members 19 and pivotally securing the said channel members in a see-saw manner to the bottom of the container as disclosed to advantage in Figs. 4 and 5. Each of the said inverted channel members 19 is capable of receiving and guiding a disc type phonograph record and is hereinafter referred to as the record holder. Each of the said record holders is provided with a bearing supporting member 20, which member 20 is preferably formed of sheet metal and is rigidly secured to the holder in any suitable manner and extends downwardly from the sides thereof as indicated at 21 and 22 in Fig. 6.

A narrow elongated base member 23, preferably made of sheet metal, is fixed to the bottom of the container and is formed with a plurality of spaced lips 24, forming U-shaped projections that are adapted to receive the downwardly extending side portions 21 and 22 of the record holder bearing supporting members 20. An elongated shaft 25 extends through the said downwardly extending side portions of the bearing members 20 and U-shaped projections 24 of the base member, whereby all of the record holders are pivotally secured to the base member.

Each of the phonograph record holders 19 is provided with a suitable push button 26, preferably in the form of an elongated handle, rigidly secured to the front portion of the holder by a suitable bolt and nut 27 and 28, respectively, as disclosed to advantage in Figs. 4 and 5. The outer end portion of each push button 26 is provided with suitable indicia for identifying the particular records in the holder. The indicia may be in the form of letters as shown in Fig. 1, or in the form of numbers if desired. A suitable means can also be provided adjacent each slot in the front wall of the container specifying the name of the record that will be dispensed through that particular slot. It will be noted that an index sheet 29 bearing the names of the records with their respective identification indicia can be provided and positioned on the door 30 of the phonograph cabinet 31 as shown in Fig. 2, whereby the indicia on the push button designating a certain record can be readily ascertained.

When the push button is in its upper position as illustrated in Fig. 4, the record 16 will be in its normal position in the container and will rest against the stop member 17 therein. It will also be noted that when the said record is in its normal position as shown in Fig. 4, the center thereof will be to the left of the pivoting point 25 of the record holder, whereby the inner end portion of the said holder is tilted downwardly toward the rear of the container, thereby causing the record to roll against the said stop 17 and in which position the outer lower end portion of the bearing member 20 of the record holder 19, rests on the bottom 10 of the container. When the push button is pressed downwardly to the position shown in Fig. 5, the said record holder 19 will be tilted toward the front of the container causing the record to roll through its respective slot and against the inner end of the push button and in which dispensed position the record is receivable by the user. Thus, all that is necessary to obtain the record desired is to press the push button identifying that particular record. The container may be positioned in the phonograph cabinet as disclosed to advantage in Fig. 2, which cabinet can be of any conventional type and the said container constructed to accommodate the particular cabinet employed.

It is to be understood that the form of my invention herewith shown and described is to be taken as a preferred example of the same and that various changes relative to the shape, size, material and arrangement of parts may be resorted to without departing from the spirit of the invention or the scope of the subjoined claim.

Having thus described my invention, I claim:

A device of the character described comprising a substantially rectangular container, a wall in the front portion thereof, a plurality of vertical slots through the said front wall, a plurality of elongated U-shaped members, one of which is positioned in alignment with each slot, each U-shaped member capable of vertically carrying a phonograph disc record, a handle on the outer extremity of each U-shaped member and extending therefrom through each slot, a stop member in the rear bottom portion of the container on which the records rest, said stop member extending longitudinally through the container, a series of spaced partitions positioned between the slots and extending at an angle upwardly from the said stop member to the front wall of the container, a supplemental series of spaced U-shaped members fixed to the bottom of the container for supporting the first mentioned U-shaped members that carry the disc records, and means pivotally securing the first mentioned U-shaped members to the second mentioned U-shaped members, whereby the disc records are caused to roll through their respective slots in the front wall of the container when their respective handles are pushed downwardly and to roll back in the container when the said handles are pushed upwardly.

THOMAS W. CHRISTIE.

REFERENCES CITED

The following references are of record in the file of this patent:

UNITED STATES PATENTS

| Number | Name | Date |
|---|---|---|
| 798,028 | Farrell | Aug. 22, 1905 |
| 1,066,138 | Nichols | July 1, 1913 |
| 1,231,326 | Bolton | June 26, 1917 |
| 1,289,961 | Thomas | Dec. 31, 1918 |
| 1,425,771 | Howard | Aug. 15, 1922 |
| 1,525,033 | Haag | Feb. 3, 1925 |
| 1,587,200 | Sutcliffe | June 1, 1926 |

FOREIGN PATENTS

| Number | Country | Date |
|---|---|---|
| 150,656 | Switzerland | Nov. 15, 1931 |